United States Patent [19]
Alley et al.

[11] 4,250,435
[45] Feb. 10, 1981

[54] CLOCK RATE CONTROL OF ELECTRONICALLY COMMUTATED MOTOR ROTATIONAL VELOCITY

[75] Inventors: Robert P. Alley, Manlius; Richard C. Weischedel, Camillus, both of N.Y.

[73] Assignee: General Electric Company, Louisville, Ky.

[21] Appl. No.: 109,579

[22] Filed: Jan. 4, 1980

[51] Int. Cl.³ ............................................. H02P 6/02
[52] U.S. Cl. ................................. 318/138; 318/254; 318/439; 318/696
[58] Field of Search .................. 318/138, 254, 254 A, 318/439, 696

[56] References Cited

U.S. PATENT DOCUMENTS

| | | |
|---|---|---|
| 3,152,462 | 10/1964 | Elliott et al. . |
| 3,152,463 | 10/1964 | Sones et al. . |
| 3,279,223 | 10/1966 | Severance et al. . |
| 3,369,381 | 2/1968 | Crane et al. . |
| 3,503,228 | 3/1970 | Lake . |
| 3,754,175 | 8/1973 | Grault . |
| 3,783,357 | 1/1974 | Ichiyanage . |
| 3,783,359 | 1/1974 | Malkiel ................................. 318/439 |
| 3,840,790 | 10/1974 | Stich et al. . |
| 3,911,339 | 10/1975 | Rettig . |
| 3,931,556 | 1/1976 | Ban et al. . |
| 3,932,793 | 1/1976 | Müller . |
| 3,949,283 | 4/1976 | Okuyama et al. ..................... 318/138 |
| 3,979,651 | 9/1976 | Bringol . |
| 4,088,932 | 5/1978 | Okuyama et al. ..................... 318/138 |
| 4,107,594 | 8/1978 | Jacobs ................................... 318/138 |
| 4,107,595 | 8/1978 | Campe . |
| 4,119,895 | 10/1978 | Müller ................................... 318/138 |

Primary Examiner—J. V. Truhe
Assistant Examiner—John W. Redman
Attorney, Agent, or Firm—Radford M. Reams

[57] ABSTRACT

A speed control system for an electrically commutated motor which is readily adaptable to digital velocity control input and which provides highly efficient and accurate control in a relatively inexpensive manner. Desired motor rotational velocity is commanded by an input clock rate, which may be variable, rather than by a voltage or current signal. A sensor is provided for determining actual rotor position, and actual rotor position is periodically compared with instantaneous desired motor position as indicated by the time of occurance of one of the input clock signals or pulses. Depending upon the results of this periodic comparison, a dynamically established active current limit is modified. Specifically, if motor rotor actual position leads desired position, the current limit is reduced. If, on the other hand, actual motor position is lagging, the current limit is increased. If the rotor is at the correct position, or within a predetermined deadband, the current limit is unchanged. This control action occurs simultaneously with conventional winding commutation taking place under the control of a, commutation sequencer periodically advanced in conventional fashion as the rotor reaches each of a plurality of predetermined positions.

12 Claims, 7 Drawing Figures

CLOCK RATE CONTROL OF ELECTRONICALLY COMMUTATED MOTOR ROTATIONAL VELOCITY

CROSS-REFERENCE TO RELATED APPLICATIONS

A specific embodiment of the present invention comprises the subject matter of a commonly-assigned application Ser. No. 109,586, filed Jan. 4, 1980, by Robert P. Alley and entitled "Combination Microprocessor and Discrete Element Control System for a Clock Rate Controlled Electronically Commutated Motor." Additionally, the subject matter of another commonly-assigned application Ser. No. 109,587, filed Jan. 4, 1980, by Robert P. Alley and entitled "Operating Circuit for an Electronically Commutated DC Motor" is disclosed, but not claimed, herein.

BACKGROUND OF THE INVENTION

The present invention relates to a motor velocity control system employing feedback to maintain actual motor rotational velocity at or near a desired rotational velocity and, more particularly, to such a motor control system readily adaptable to frequent changes in motor velocity and direction for use in a direct drive clothes washing machine.

Typical commercially produced domestic clothes washing machine designs have employed a constant speed motor, for example rotating at 1800 rpm, in combination with a mechanical transmission system selectively operable to provide either relatively low speed oscillatory motion for agitaion, or relatively higher speed (for example 600 rpm) unidirectional rotation for spinout operations.

In the prior art there are a number of proposals to eliminate the complexity of a mechanical transmission, particularly that complexity associated with providing agitation, by employing a direct drive DC motor coupled (either directly or through simple reduction gearing) to the agitator and basket of a clothes washing machine. Through suitable input control signals, a DC motor may be readily controlled as to both rotational velocity and direction, including periodic reversing, to effect the required motions.

By way of example, the following patents are identified for their disclosures of various forms of direct drive clothes washing machines: Elliott et al. U.S. Pat. No. 3,152,462; Sones et al. U.S. Pat. No. 3,152,463; Severence et al. U.S. Pat. No. 3,279,223; Crane et al. U.S. Pat. No. 3,369,381; and Lake U.S. Pat. No. 3,503,228.

For such variable speed service, it is desirable that the motor controller continuously accept variable velocity information defining an agitator motion profile which may, for example, be a sinusoidal profile in the order to one or two Hertz as is the case with conventional mechanical transmissions, or may be any other waveform which may be found desirable in clothes washing applications. Typically such velocity control information is introduced into the system in the form of a variable voltage or current.

For accurate motion profile control, it is highly preferable that some form of feedback be employed to maintain motor energization at a level sufficient to maintain desired rotational velocity. A wide variety of feedback systems have been proposed and implemented, for example, employing pulse width modulated chopper circuits. Inherent in all such systems is some means of sensing actual motor rotational velocity, comparing the actual motor rotational velocity to desired velocity, and generating an "error" signal, which is then appropriately applied to a control element, such as a pulse width modulator, to adjust motor energization as required. Typical such systems adjust applied motor voltage for speed control.

In addition to the patents identified above for their disclosures of washing machine controls, the following patents are identified for their disclosures of related motor control circuits for applications other than clothes washing machines: Girault U.S. Pat. No. 3,754,175; Ichiyanage U.S. Pat. No. 3,783,357; Stichh et al. U.S. Pat. No. 3,840,790; Rettig U.S. Pat. No. 3,911,339; Ban et al. U.S. Pat. No. 3,931,556; Muller U.S. Pat. No. 3,932,793; Bringol U.S. Pat. No. 3,979,651; and Campe U.S. Pat. No. 4,107,595.

SUMMARY OF THE INVENTION

It is an object of the invention to provide a speed control system for an electronically commutated motor which is readily adaptable to digital velocity control input and which provides highly efficient and accurate control in a relatively inexpensive manner.

Briefly stated, and in accordance with an important concept of the invention, desired motor rotational velocity is commanded by an input clock rate, which may be variable, rather than by a voltage or current signal. In accordance with the invention, a sensor is provided for determining actual rotor position, and actual rotor position is periodically compared with instantaneous desired motor position as indicated by the time of occurance of one of the input clock signals or pulses. Depending upon the results of this periodic comparison, a dynamically established active current limit is modified. Specifically, if motor rotor actual position leads desired position, the current limit is reduced. If, on the other hand, actual motor position is lagging, the current limit is increased. If the rotor is at the correct position, or within a predetermined deadband, the current limit is unchanged.

This control action occurs simultaneously with conventional winding commutation taking place under the control of a commutation sequencer periodically advanced in conventional fashion as the rotor reaches each of a plurality of predetermined positions. It will be understood, however, that the commutation sequence advancing signals may be slightly modified or altered in time, depending upon the requirements of a particular system, without departing from the scope of the invention.

The control concept described herein presumes that there is some means of at least periodically determining actual rotor position. Many such means are possible, such as light choppers or Hall effect sensors. However, the presently preferred method for sensing actual rotor position is that which is described in the commonly-assigned Wright U.S. Pat. No. 4,162,435. Briefly, in the approach described in the Wright patent induced voltage is sensed across an unenergized winding, and that voltage simple is integrated and compared to a reference voltage. When the voltage integral exceeds the reference voltage, the system recognizes that a predetermined rotor position has been reached and the commutation sequence proceeds to the next step.

Briefly stated, and in accordance with a more particular aspect of the invention, a speed control system for an electronically commutated motor having a rotor and a plurality of stator windings operable to produce magnetic fields in response to selective winding energization includes a commutation sequencer operable to selectively energize the motor windings in a sequence appropriate for effecting motor rotor rotation. The commutation sequencer is operable to advance step by step through the sequence as the rotor reaches each of a plurality of predetermined positions. The system additionally includes a storage device, such as a digital counter or a capacitor sample and hold circuit, for storing a representation of an established limit for motor winding current. A controller limits current through the motor windings energized by the sequencer to the established limit. The system additionally includes a sensor for determining actual rotor position, and a source of periodic signals representative of desired rotor position, and occurring at a rate proportional to desired rotational velocity. The time of occurrence of each individual one of the periodic signals is representative of a particular instantaneous desired rotor postion. An adjustment element is responsive to the sensor and to the periodic signal source and operable to periodically compare actual rotor position to desired rotor position and to decrease the established limit for motor winding current in the event actual rotor position leads desired rotor position by at least a predetermined amount, and to increase the established limit for motor winding current in the event actual rotor position lags desired motor position by at least a predetermined amount.

In the operation of this system, changing the current limit in the time ratio control circuit changes motor voltage since the motor inductance is acting as the inductor of a time ratio voltage control circuit. The system has characteristics of a torque balancing circuit.

Preferably, as mentioned above, the source of periodic signals generates the periodic signals at a controlled variable rate such that motor rational velocity is correspondingly varied.

The present invention additionally contemplates a method for controlling the rotation velocity of an electronically commutated motor, the method including the steps of providing a series of periodic signals representative of desired rotation velocity, the periodic signals occurring at a rate proportional to desired rotation velocity with each of the periodic signals representative of a particular instantaneous rotor position. Further, the method includes the steps of sensing rotor position and limiting current through energized motor windings to an established limit. To adjust the established limit, sensed motor position is periodically compared to desired rotor position and in the event actual rotor position leads desired rotor position by at least a predetermined amount, the established current limit is to decrease, and, in the event actual rotor position lags desired rotor position by at least a predetermined amount, the established current limit is increased.

In the particular implementation described in detail hereinbelow, the motor has a permanent magnet rotor and three "Y" connected stator windings, the ends of which are connected to transistor power switching elements which serve both as commutating switches and as time ratio control elements to set effective motor voltage. Additionally, the power supply for the system is substantially unfiltered DC obtained by a bridge rectifier and a fairly minimal amount of filter capacitance. Embodiments of the present invention have been found to be highly suitable for operating in this environment. However, it will be understood that the invention is not so limited.

Additionally, it will be noted that the particular implementation described herein is a "hard wired" one employing descrete digital logic elements and integrated circuit devices such as operational amplifiers and comparators. However, it will readily be appreciated that the concepts and approaches of the present invention may be implemented in various other ways, in particular, through suitably programmed microcomputer controls.

For example, a suitable microprocessor-based control system implementing various aspects of the present invention is described in the commonly assigned patent application of Robert P. Alley, Ser. No. 109,586, filed Jan. 4, 1980 and entitled "Combination Microprocessor and Discrete Element Control System for a Clock Rate Controlled Electronically Commutated Motor." In the system described in this reference Alley application, a relatively slow microcomputer is used to performm certain low speed control functions, such as commutation, and discrete circuit elements are used advantageously to perform other functions which would require a relatively higher speed (and more expensive) microcomputer to be accomplished in real time.

Notwithstanding, it will be apparent that the control functions and concepts of the present invention may also be implemented in a microcomputer based system wherein the microcomputer, under program control, itself performs substantially all of the control functions required, including integral calculation.

Accordingly, it will be appreciated that the present invention is not limited to a motor having any particular winding configuration, is not limited to the particular implementation described herein, and is not limited to any particular means of determining actual rotor position. Further, other techniques for effectively limiting motor winding current may be implemented.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed of description taken in conjunction with the drawings, in which:

DETAILED DESCRIPTION OF THE PREFERRED EMBODIMENT

Figure 1:
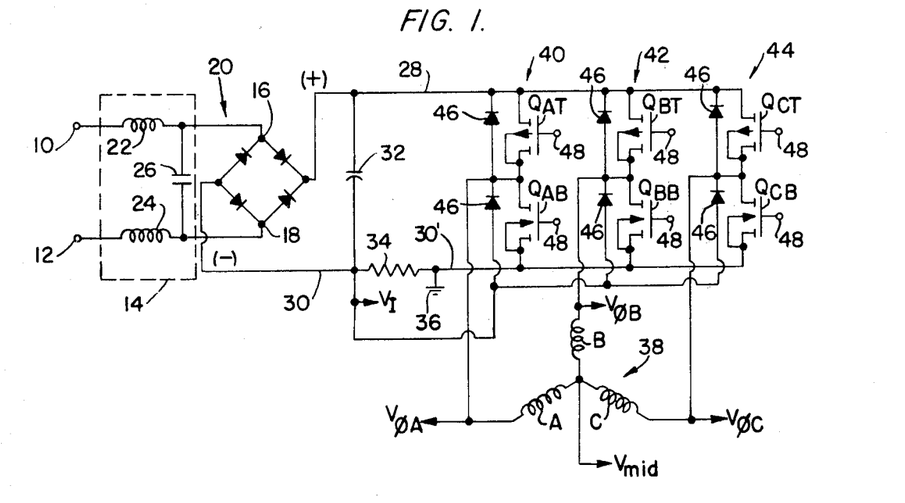
FIG. 1 is overall electrical schematic diagram of the power handling portions of a circuit for controlling a three phase electronically commutated motor (ECM)

With reference now to the drawings wherein identical reference numerals represent similar or corresponding elements throughout the various diagrams, in FIG. 1, 120 volt, 60 Hz AC from a conventional household branch circuit is applied to AC input terminals 10 and 12 connected through an electromagnetic interference (EMI) filter 14 to the AC input terminals 16 and 18 of a full wave bridge rectifier 20. As indicated, the EMI filter 14 may comprise a pair of series inductors 22 and 24, each for example having an inductance of 250 microhenries, with a 0.05 microfarad capacitor 26 in shunt on the output side of the EMI filter 14. For additional system protection, a 150 volt metal oxide varistor (MOV) (not shown) may be connected on the output side of the EMI filter 14.

The pulsating DC output of the bridge rectifier 20 is applied to respective positive and negative DC supply conductors 28 and 30, and a low value filter capacitor 32 is connected across the DC supply conductors 28 and 30. The capacitor 32 is sized to further reduce electromagnetic interference and to provide adequate local energy storage for supplying chopping components of current while, at the same time, having minimum adverse impact upon input power factor. The voltage across the DC supply conductors 28 and 30 thus remains a relatively high ripple DC input voltage or, expressed alternatively, substantially unfiltered rectified AC power.

In order to sense the instantaneous current supplied to the remaining elements of FIG. 1, a 0.05 ohm current sensing resistor 34 is connected in series between the negative DC supply conductor 30 and an extension 30' thereof. A current sensing line $V_I$ is connected to one terminal of the current sensing resistor 34 to sense the voltage drop thereacross. The current sensing signal on the $V_I$ line is referenced to a circuit reference point 36 connected to the extended negative DC supply conductor 30'.

At the right hand side of FIG. 1 is shown an electronically commutated (ECM) bi-directional, variable speed DC motor generally designated 38 intended for application in a direct drive clothes washing machine. More particularly, the motor 38 is represented by stator windings A, B and C, connected in a "Y" configuration. It will be appreciated that the motor 38 requires a rotor, such as a conventional permanent magnet rotor (not shown) which rotates in either direction depending upon the energization sequence of the windings A, B and C.

Electrical connections to the ends of the windings A, B and C of the motor 38 are respectively identified as $V_{\phi A}$, $V_{\phi B}$ and $V_{\phi C}$. The midpoint connection, employed for sensing purposes, is identified as $V_{mid}$.

Connected to the windings A, B and C of the motor 38 and supplied from the positive and negative DC supply conductors 28 and 30' are three power switching sections respectively designated 40, 42 and 44. Generally speaking, each of the switching sections 40, 42 and 44 comprises a power switch which is capable of connecting the end of the respective motor winding A, B or C to either the positive supply line 28 or the negative supply line 30'. For motor 38 winding A, the top switch is designated $Q_{AT}$, and the bottom power switch is designated $Q_{AB}$. The same nomenclature is employed for similar power switches the other two switching sections 42 and 44.

For purposes of illustration, the power switches are illustrated as power field effect transistors capable of switching 200 volts DC, with three amperes average current, and ten amperes peak current. However, other switching devices may equally well be employed, such as bipolar transistors.

In the particular circuit illustrated, the upper power switches for connecting respective winding ends to the positive DC supply conductor 28 are depletion mode power field effect transistors $Q_{AT}$, $Q_{BT}$ and $Q_{CT}$. For the lower switching transistors which serve to connect the motor winding ends to the negative DC supply conductor 30', enhancement mode power field effect transistors $Q_{AB}$, $Q_{BB}$ and $Q_{CB}$ are employed. Also shown in FIG. 1 are free wheeling diodes 46 connected across the respective source and drain terminals of the power switching transistors.

In the general operation of the circuit of FIG. 1, suitable gate drive signals are applied to the power switching transistor gate terminals 48. As is more fully explained hereinbelow, both the top switching transistors $Q_{AT}$, $Q_{BT}$ and $Q_{CT}$ and the bottom switching transistors $Q_{AB}$, $Q_{BB}$ and $Q_{CB}$ are used for the commutating function. The top switching transistors $Q_{AT}$, $Q_{BT}$ and $Q_{CT}$ are additionally rapidly switched on and off in chopper fashion (time ratio control) during each commutation cycle in order to limit average current through whichever of the motor windings A, B and C are energized at any given time. In this manner, effective applied motor voltage is controlled to be that required to maintain motor velocity, with the inductance of the motor windings A, B and C providing voltage smoothing.

Figure 2:
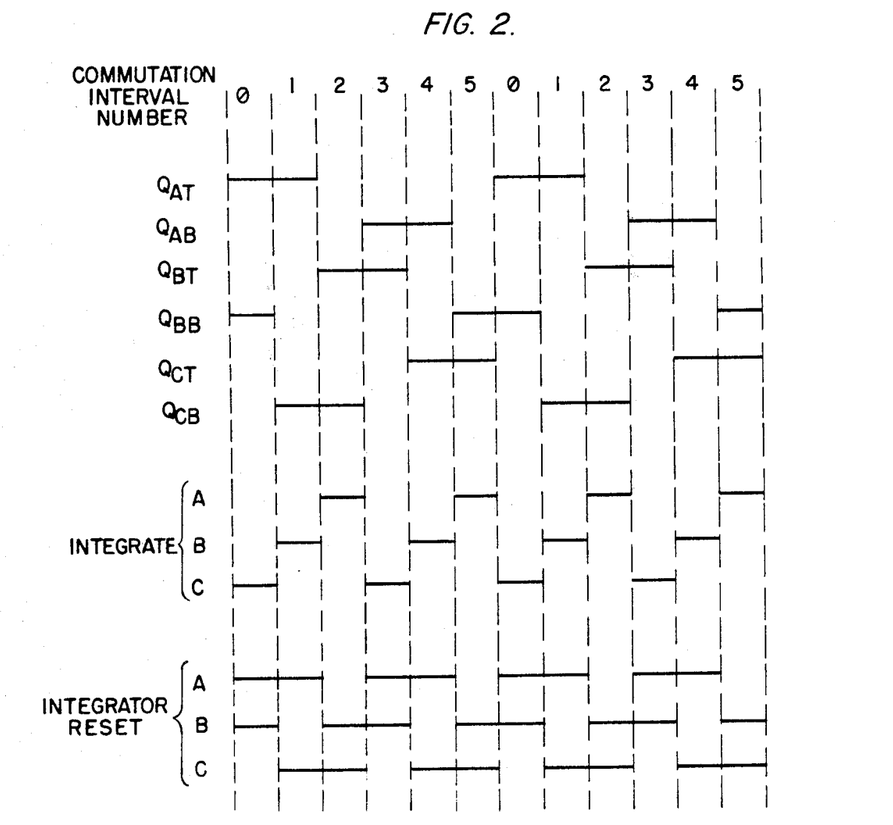
FIG. 2 is a commutation sequence diagram depicting the overall operation of the FIG. 1 circuit.

The general manner in which the motor 38 is operated will now be described with particular reference to the timing sequence chart of FIG. 2. In FIG. 2, each rotation cycle of the motor 38 is divided into six commutation intervals identified as $\phi$, 1, 2, 3, 4 and 5, each of the commutation intervals representing sixty electrical degrees. The commutation sequence continuously repeats in one direction or the other, depending upon whether clockwise or counterclockwise motor rotation is desired, and at a frequency dependent upon motor speed. It will be appreciated that while the particular sequence shown for purposes of illustration is for a "Y" connected three winding motor, other sequences are appropriate for other motor winding configurations, and the particular sequence shown is in no way intended to limit the scope of the invention.

In FIG. 2, the series of lines designated $Q_{AT}$ through $Q_{CB}$ designate specifically during which of the commutation intervals the power switching transistors of FIG. 1 are energized. It will be seen that, at any instant, one of the top switching transistors $Q_{AT}$, $Q_{BT}$ or $Q_{CT}$ is energized and one of the bottom switching transistors $Q_{AB}$, $Q_{BB}$ or $Q_{CB}$ is energized, thus energizing two of the three motor 38 windings A, B and C by appropriately connecting respective ends thereof to the positive and negative DC supply conductors 28 and 30'. The commutation sequence shown results in motor rotation in one direction as interval numbers repeatedly count up going from left to right across the drawing sheet, and results in motor rotation in the other direction as the interval numbers repeatedly count down going from right to left across the drawing sheet.

In the illustrated sequence, it will be seen that at any instant two of the motor windings A, B and C are energized, and one is unenergized. In accordance with the teachings of the commonly-assigned Wright U.S. Pat. No. 4,162,435, the entire disclosure of which is hereby incorporated by reference, the induced voltage across an unused winding is sensed and integrated as an indicator of rotor position. Thus the "Integrate" A, B and C lines of FIG. 2 indicate the time intervals during which the voltage across each of the motor windings A, B and C is respectively sensed and integrated to provide position information. Similarly, the "Integrator Reset" lines A, B and C indicate that a respective integrator channel is not being employed for integration because driving current is flowing through the associated motor winding, and the integrator channel is accordingly held in a "reset" condition.

While the integral sensing approach such as disclosed in the Wright U.S. Pat. No. 4,162,435 is presently preferred in the practice of the present invention, and suitable integration circuitry is described below with particular reference to FIG. 5, it will be appreciated that this particular method of sensing rotor position is in no way an essential or limiting aspect of the present invention, but simply is one which is preferred as a matter of convenience. It will be appreciated that a wide variety of rotor position sensing methods are presently known, and undoubtedly with continue to be developed, any of which may be suitable. By way of example, and without limitation, optical sensing schemes, magnetic sensing schemes employing Hall effect transducers or reed switches, or mechanical switches may be employed.

Figure 3:
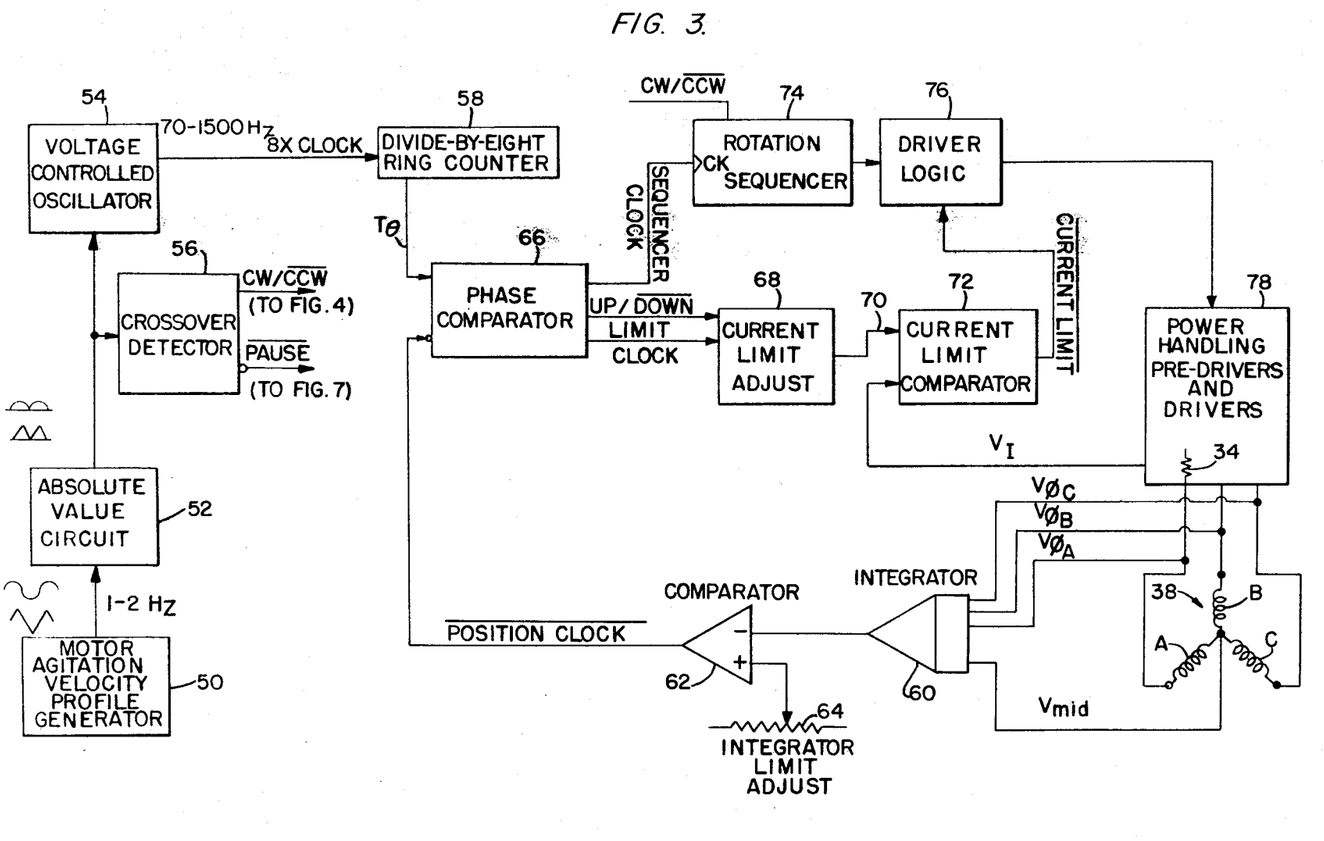
FIG. 3 is an overall block diagram of a control system in accordance with the present invention.

Referring now to the overall control block diagram of FIG. 3, a control suitable for driving the motor 38 in the context of a direct drive clothes washing machine is illustrated.

Overall, the FIG. 3 circuit comprises an outer velocity servomechanismm loop employing feedback to enable the comparison of actual velocity with desired velocity and the correction of errors. This outer loop may alternatively be termed an instantaneous position servomechanism. Additionally, the FIG. 3 circuit includes an inner current feedback loop which functions to limit motor winding current to a dynamic current limit value which is periodically established and reestablished depending upon the velocity (or instantaneous position) error.

A particular advantage of the speed control approach described herein is that an input clock rate directly controls motor velocity. For establishing a clothes washing machine agitator velocity profile, it is contemplated that speed (and direction) for a number of points (e.g., sixteen) would be digitally stored and used to control programmable digital dividers, or the like, to establish the variable input clock rate. However, for illustrative purposes, the particular implementation described herein employs a simple voltage controlled oscillator to generate the variable rate clock input signals.

For establishing the motor agitation velocity profile, a generator 50 outputs a low frequency, for example one or two Hertz, oscillatory signal of suitable waveform selected to provide desired clothes washing action. For example, simple sinusoidal agitator motion, as is conventionally done, may be implemented, or a triangular agitation velocity profile may be employed. A suitable motor agitation velocity profile generator 50 may be constructed from a monolithic integrated circuit function generator such as an Exar Type No. XR2206. The output $\Delta$ of the motor agitation velocity profile generator 50 is applied to the input of an absolute value circuit 52 which may comprise a conventional full wave precision rectifier employing operational amplifiers, with an appropriate level shifting network.

The output of the absolute value circuit 52 is in turn applied to a voltage controlled oscillator 54 which may, for example, comprise another monolithic integrated circuit function generator such as an Exar type number XR2206 appropriately connected to produce square wave output signals in the frequency range of 70–1500 Hz. The voltage controlled oscillator 54 supplies a line identified as 8X CLOCK.

In accordance with the principles of the present invention, the frequency of the clock pulses on the 8X CLOCK line commands desired motor rotational velocity and, in the particular implementation shown, has a frequency of eight times the desired motor rotational velocity expressed as commutation intervals per second. In other words, for each of the FIG. 2 commutation intervals identified as $\phi$ through 5, eight pulses on the 8X CLOCK line occur. In the particular implementation herein described, the frequency on the 8X CLOCK line varies within the range of 70 to 1500 Hz, depending at any given moment on the output of the motor agitation velocity profile generator 50.

Also connected to the output of the absolute value circuit 52 is a crossover detector 56, which may comprise a simple comparator and a toggle flip-flop, which senses the output of the motor agitation velocity profile generator 50 through the absolute value circuit 52 to determine when agitator velocity is decreasing to near zero just prior to a reversal of direction. In particular, the crossover detector 56 outputs a signal on a CW/$\overline{\text{CCW}}$ line which indicates whether desired rotation is in a clockwise or counterclockwise direction, and outputs a signal on a $\overline{\text{PAUSE}}$ line which indicates that a momentary pause in motor energization is required as motor rotation velocity approaches zero in anticipation of a direction reversal.

The 8X CLOCK line is applied to the clock input of a divide-by-eight ring counter 58 which produces an output pulse on a $T_\phi$ line once every eight 8X CLOCK cycles. The signal on the $T_\phi$ line indicates instantaneous desired rotor position.

In order to determine motor rotor position, an integrator 60 is appropriately connected to the motor windings A, B and C for the purpose of integrating voltage across an unused winding in accordance with the teachings of the above referenced commonly assigned Wright U.S. Pat. No. 4,162,435. The output of the integrator 60 is applied to the inverting (−) input of a comparator 62 which supplies a $\overline{\text{POSITION CLOCK}}$ line which goes low to indicate the instant actual rotor position reaches a predetermined point as determined by an integrator limit adjust potentiometer 64. A suitable integrator 60 and comparator 62 are described hereinbelow with particular reference to FIG. 5.

As mentioned above, it will be appreciated that the particular method illustrated herein for determining actual rotor position is illustrative only of a preferred embodiment of the invention, and in no way is intended to limit scope of the claimed invention. What is important is that some means be provided for determining rotor position.

In order to compare motor actual position with instantaneous desired rotor position, a phase comparator 66 receives the $T_\phi$ output of the divide-by-eight ring counter 58 and the $\overline{\text{POSITION CLOCK}}$ output from the comparator 62.

An important function of the phase comparator 66 is to periodically output a signal or signals indicating which one of the following three conditions is occurring: (1) actual rotor position as indicated by the $\overline{\text{POSITION CLOCK}}$ line is leading desired rotor position as indicated by the $T_\phi$ line; (2) the motor rotor is at the correct position; or (3) the actual rotor position is lagging the desired rotor position. The output of the phase comparator 66 is, in effect, what is conventionally termed a velocity or instantaneous position "error" signal.

The result of this decision is indicated by a representative pair of output lines designated UP/$\overline{\text{DOWN}}$ and LIMIT CLOCK. As may be seen in FIG. 3, these two lines are applied to a current limit adjust circuit 68 which, in turn, is applied to the reference input 70 of a current limit comparator 72 which is an element of a current feedback loop within the overall velocity feedback loop depicted in FIG. 3.

More particularly, in accordance with the invention, the phase comparator UP/$\overline{\text{DOWN}}$ and LIMIT CLOCK outputs and the current limit adjust circuit 68 cooperate to adjust the motor winding current limit as required to maintain the signals on the $T_\phi$ and the $\overline{\text{POSITION CLOCK}}$ lines substantially in phase.

In particular, if actual rotor position is leading desired rotor position, the motor winding current limit is reduced. If the motor is at the correct position, or at least within a predetermined tolerance range expressed as a deadband, the motor winding current limit is unchanged. If the actual rotor position is lagging behind desired instantaneous rotor position, the motor winding current limit is increased. Additionally, in the event actual rotor position is lagging desired rotor position, the commutation sequence as depicted in FIG. 2 is preferably momentarily inhibited from advancing until the rotor is in the correct position. Expressed alternatively, the commutation sequence does not proceed until the rotor is actually at a position appropriate for commutation. Otherwise, the circuit could loose synchronization.

The phase comparator 66 has another output appearing on a SEQUENCER CLOCK line which is applied to the clock (CK) input of a rotation sequencer 74 which may simply comprise a six stage recirculating ring counter or shift register to generate the commutation intervals $\phi$, 1, 2, 3, 4 and 5 represented in FIG. 2. The rotation sequencer 74 functions to advance to the next interval upon each clock input from the SEQUENCE CLOCK line, with a direction determined by the CW/$\overline{\text{CCW}}$ line from the crossover detector 56.

The rotation sequencer 74 has six output lines respectively corresponding to the six commutation intervals as shown in FIG. 2. The rotation sequencer 74 output lines are applied to driver logic circuitry 76 which functions, by means of a decoding network described hereinbelow with particular reference to FIG. 4, to output appropriate signals indicating which two of the power switching transistors of FIG. 1 are to be activated at any given instant to effect the commutation sequence of FIG. 2. The driver logic 76 output is then applied to a circuit block 78 including power handling pre-drivers and drivers appropriate to the particular transistors $Q_{AT}$ through $Q_{CB}$ employed in FIG. 1. No particular circuitry for the power handling pre-drivers and drivers 78 is illustrated herein. It will be appreciated, however, that there are a number of suitable driver circuits which may be employed.

Although not shown in FIG. 3, the rotation sequencer 74 additionally outputs signals to the integrator 60 indicating which of the three motor windings A, B or C is unused any given moment, and which two of the three integrator channels are to be reset.

The remaining FIGS. 4-7 are detailed schematic diagrams of circuitry in accordance with one embodiment of the invention. The specific implementation herein described employs a number of conventional monolithic integrated circuit devices, both analog and digital. In particular, the described digital logic functions are implemented in CMOS, the CD4000 series of COS/MOS devices manufactured by RCA Corporation being suitable. For analog circuit functions, conventional monolithic integrated circuit operational amplifiers and comparators may be employed. It will be appreciated that all of these devices require suitable power supply connections, which connections, for clarity of illustration, are omitted from the drawings. Similarly, suitable low voltage DC power supplies are required. These are of conventional design, and are omitted from the drawings. In particular, a +12 volt DC supply is required for the CMOS digital logic elements. Following conventional nomenclature, the +12 volt output of the supply is designated $V_{DD}$ and is referenced to the circuit reference point 36, which also is termed $V_{SS}$. The various operational amplifiers and comparators are supplied from this +12 volt supply and, additionally, are supplied from a separate −12 volt supply, also referenced to the circuit reference point 36 and to $V_{SS}$.

Figure 4:
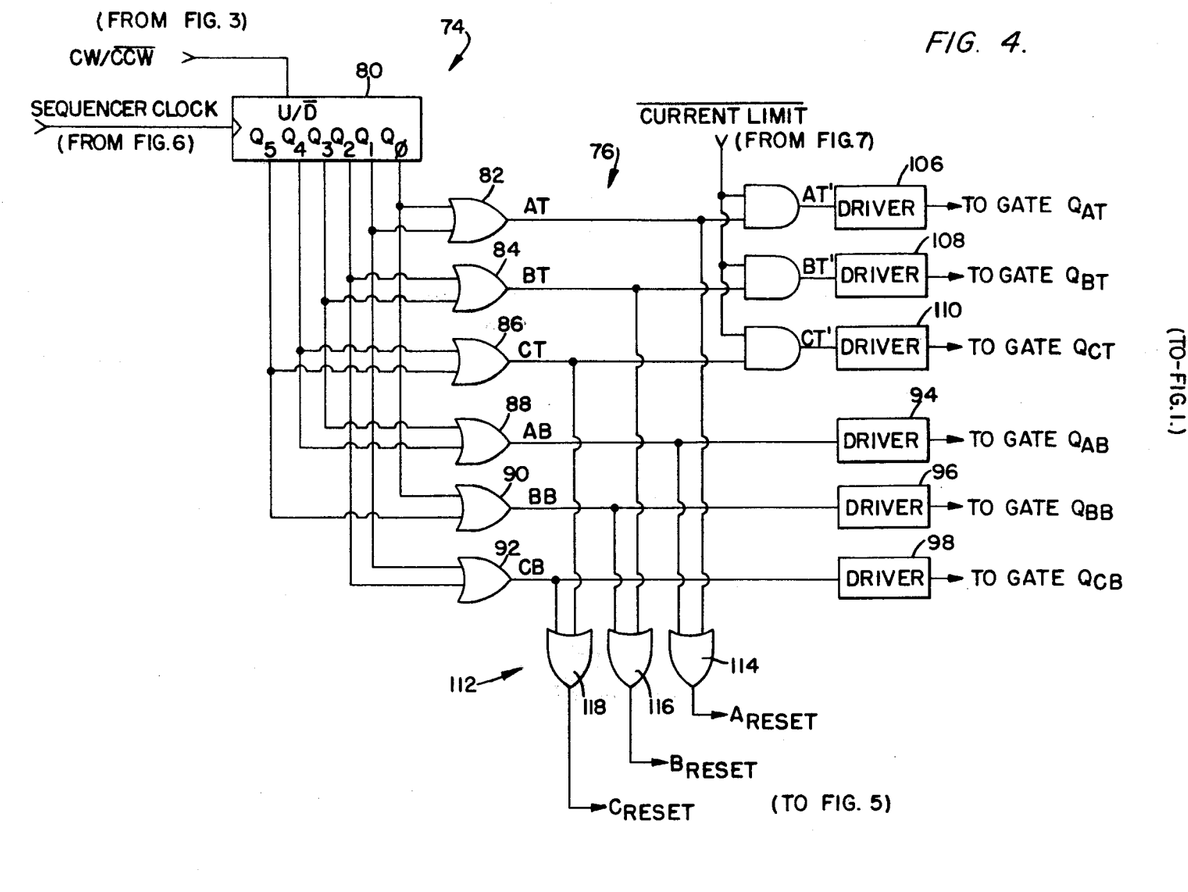
FIG. 4 is a detailed logic schematic diagram of the rotation sequencer and driver logic portions of the FIG. 3 block diagram.

Referring now to FIG. 4, the rotation sequencer 74 of FIG. 3 may more particularly be seen to comprise a bidirectional ring counter 80 or equivalent circuit element. The ring counter 80 has six outputs designated $Q_\phi$ through $Q_5$ which individually go high in sequence to establish the commutation intervals of FIG. 2. The bidirectional ring counter 80 has a clock (CK) input connected to the SEQUENCER CLOCK output of the phase comparator (FIGS. 3 and 6), and functions to advance to the next state in response to each high going transistion on the SEQUENCER CLOCK line. The direction of counting or shifting of the ring counter 80 is controlled by a U/$\overline{\text{D}}$ input connected to the CW/$\overline{\text{CCW}}$ line from the crossover detector 56 (FIG. 3).

The bidirectional ring counter 80 may be implemented in various ways. For example, a monolithic integrated circuit Up/Down counter may be connected to a BCD-to-decimal decoder, with appropriate feedback to establish a counting sequence.

The six outputs $Q_\phi$ through $Q_5$ of the bidirectional ring counter 80 comprising the rotation sequencer 74 are connected to the driver logic 76 which may more particularly be seen in FIG. 4 to comprise six OR gates 82, 84, 86, 88, 90 and 92, each corresponding with one of the power switching transistors $Q_{AT}$ through $Q_{CB}$ of FIG. 1. The OR gates 82, 84, 86, 88, 90 and 92 are appropriately connected to the $Q_\phi$ through $Q_5$ outputs of the bidirectional ring counter so as to be activated in accordance with the commutation sequence timing diagram of FIG. 2. For example, the transistor $Q_{AT}$ is switched on during commutation interval numbers $\phi$ and 1. Accordingly, the inputs of the OR gate 82 are connected to the $Q_\phi$ and $Q_1$ outputs of the ring counter 80. When either the $Q_\phi$ or the $Q_1$ output is high, the OR gate 82 is activated, providing an output on line AT. Since, as previously noted, the three lower switching transistors $Q_{AB}$, $Q_{BB}$ and $Q_{CB}$ are used for commutation only, the output lines AB, BB and CB of the respective OR gates 88, 90 and 92 are connected directly to suitable transistor gate drivers 94, 96 and 98 which, as previously mentioned, are of conventional design, compatible with the gate drive requirements of the particular power switching transistors employed.

The upper switching transistors of FIG. 1, $Q_{AT}$, $Q_{BT}$ and $Q_{CT}$ are rapidly switched on and off during each commutation interval to provide motor winding current limit control, and to indirectly control effective motor voltage. More specifically, a current limiting feedback loop is employed such that whichever one of the upper trasistors $Q_{AT}$, $Q_{BT}$ and $Q_{CT}$ is currently active is momentarily switched OFF whenever a dynamically established current limit is exceeded, and then switched back ON when winding current again falls below the established current limit. In this feedback loop, winding current is sensed as voltage drop across the current sensing resistor 34 of FIG. 1 via the current sense line $V_I$.

In order to turn off the selected one of the upper switching transistors $Q_{AT}$, $Q_{BT}$ or $Q_{CT}$ when the established current limit is exceeded, the $\overline{\text{CURRENT LIMIT}}$ line from the current limit comparator 72 (described hereinbelow with particular reference to FIG. 7) is connected to enabling inputs of three AND gates 100, 102 and 104 having their signal inputs respectively connected to lines AT, BT and CT from the OR gates 82, 84 and 86. The outputs of the AND gates 100, 102 and 104 supply respective lines AT', BT' an CT' which, in turn, are connected to respective transistor gate driver circuits 106, 108 and 110.

Additionally shown in FIG. 4 is integrator reset control logic generally designated 112 and specifically comprising three OR gates 114, 116 and 118 driving output lines respectively designated $A_{RESET}$ $B_{RESET}$ and $C_{RESET}$. It will be seen that the input connections to the OR gate 114, 116 and 118 shown in FIG. 4 are appropriate to establish the integrator reset sequence of FIG. 2. The respective "RESET" lines go high when the corresponding integrator is to be reset, and go low when the corresponding integrator is to integrate voltage across an unused one of the motor windings A, B and C for the purpose of providing the $\overline{\text{POSITION CLOCK}}$ signal when a particular actual rotor position is reached.

Figure 5:
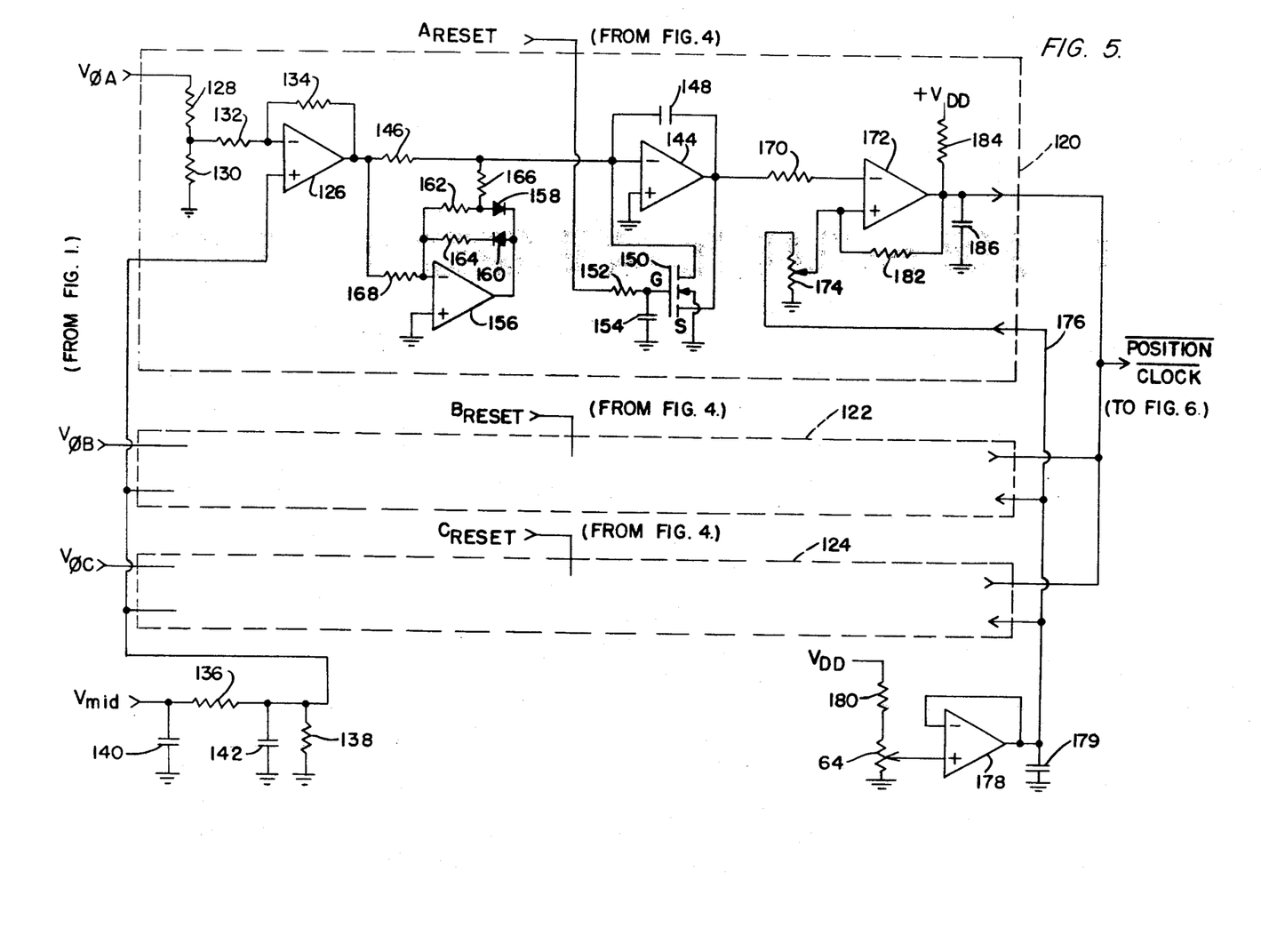
FIG. 5 is a detailed electrical schematic diagram of the integrator portion of FIG. 3, with one of three integrator channels shown in detail, with the remaining, substantially identical, integrator channels represented as dash line rectangles.

With reference now to FIG. 5, the integrator 60 and comparator 62 of FIG. 3 may more particularly be seen to comprise three individual channels corresponding respectively to the three motor windings A, B and C. While three individual integrators are employed in the embodiment described herein, it will be appreciated that a single integrator may be employed such as is suggested in the above referenced commonly assigned Wright U.S. Pat. No. 4,162,435 with the input thereof appropriately multiplexed or switched to whichever one of the motor windings A, B and C is unenergized at a particular point in the commutation sequence.

The upper integrator and comparator channel shown in FIG. 5 is designated 120 and corresponds to the motor winding A (FIGS. 1 and 3). The integrator channels corresponding to motor windings B and C are respectively shown as dash line rectangles 122 and 124 which, it will be appreciated, are substantially identical.

The integrator/comparator 120 receives inputs from the $V_{\phi A}$ line connected to the end of the winding A, and from the $V_{mid}$ line connected to the motor 38 winding midpoint. It will be appreciated that neither of these connections provides voltage across the winding A directly. In particular, the $V_{100\,A}$ line provides the voltage across the winding A plus the midpoint voltage, and the $V_{mid}$ line provides the motor midpoint voltage. In order to derive the voltage across the winding A with reference to the circuit reference point 36, the voltage on the $V_{mid}$ line is, in effect subtracted from the voltage on the $V_{\phi A}$ line. This is accomplished by means of an operational amplifier 126 in a summing amplifier configuration.

More particularly, the $V_{\phi A}$ line is applied through an input voltage divider comprising resistors 128 and 130 to an input resistor 132 connected to the inverting (−) input of the operational amplifier 126. An appropriate feedback resistor 134 is connected between the operational amplifier 126 output and the inverting (−) input.

Similarly, the $V_{mid}$ line is connected through an input resistive network comprising a series resistor 136 supplying the non-inverting (+) input of the operational amplifier 126, with another resistor 138 connected to these common circuit reference point. Noise suppression compactors 140 and 142 are connected as shown.

The output of the operational amplifier 126 is a signal (of inverted polarity sense) representative of voltage across the motor winding A.

From FIG. 5, it will be seen that the input network comprising the resistors 136 and 138 connected to the non-inverting (+) operational amplifier 126 input is also connected to the other two integrator channels 122 and 124, and will be understood to similarly be connected to corresponding operational amplifier non-inverting (+) inputs within those other two integrator channels 122 and 124.

The actual integrator comprises an operational amplifier 144 having an input resistor 146 connected to its inverting (−) input, with the opposite end of the input resistor 146 connected to the output of the summing amplifier 126. A feedback compactor 148 is connected between the operational amplifier 144 output and the inverting (−) input.

In order to periodically reset the integrator 144 to zero, the drain (D) and source (S) terminals of an enhancement mode field effect transistor 150 are connected across the terminals of the integrating capacitor 148, and the transistor 150 gate (G) terminal is connected through a current limiting resistor 152 to the $A_{RESET}$ line from the integrator reset control logic 112 of FIG. 4. A noise suppression capacitor 154 is connected between the transistor 150 gate (G) terminal and the circuit reference point.

In the operation of the integrator reset circuitry, it will be appreciated that whenever the motor winding A is energized, the OR gate 114 (FIG. 4) is activated, causing the $A_{RESET}$ line to go high. This causes the field effect transistor 150 to conduct and discharge the integrating capacitor 148. The capacitor 148 remains discharged so long as the $A_{RESET}$ line remains high.

In order to limit the input voltage from the summing amplifier 126 applied to the integrator 144, a limiting network comprising an operational amplifier 156 is provided. A feedback circuit for the operational amplifier 156 comprises a pair of oppositely poled series diode and resistor combinations comprising diodes 158 and 160, and resistors 162 and 164. The junction of the diode 158 anode and the resistor 162 is connected through a resistor 166 to the inverting (−) input of the integrator 144, and the inverting (−) input of the operational amplifier 156 is connected through an input resistor 168 to the output of the summing operational amplifier 126.

During operation, it will be appreciated that the output of the integrator 144 continuously indicates motor rotor position in accordance with the teachings of the commonly assigned Wright U.S. Pat. No. 4,162,435. In order to provide an output when the integrator 144 output exceeds a preset reference level representative of a particular actual motor position which is to be compared to desired instantaneous rotor position, the integrator 144 output is applied through an input resistor 170 to the inverting (−) input of a comparator 172. To provide a reference, the comparator 172 non-inverting (+) input is connected to an individual channel adjustment potentiometer 174 which, in turn, is supplied via a conductor 176 from the output of a buffer amplifier 178 which senses the voltage from a common integrator limit adjust potentiometer 64. To limit the range of adjustment, the upper terminal of the potentiometer 64 is connected through a resistor 180 to the $+V_{DD}$ supply.

To introduce hysteresis into the operation of the comparator 172, a positive feedback resistor 182 is connected between the comparator 172 output and the non-inverting (+) input. The output of the comparatator 172 is tied through a pull up resistor 184 to the $+V_{DD}$ supply, and a noise reducing capacitor 186 is connected between the comparator 172 output and the circuit reference point.

The comparator 172 output directly supplies the $\overline{\text{POSITION CLOCK}}$ line and functions to pull the $\overline{\text{POSITION CLOCK}}$ line low whenever the integral limit as determined by the settings of the potentiometers 174 and 64 is reached, thus indicating that the motor 38 rotor has actually reached a predetermined position. From FIG. 5, it will be seen that the outputs of corresponding comparators, which will be understood to be included within the B and C integrator channels 122 and 124, are directly tied to the output of the comparator 172 in a wired-OR configuration. This is possible because the internal output stage of the monolithic integrated circuit comparator 172 has an open collector output.

Referring again to the overall block diagram of FIG. 3, it will be appreciated that the phase comparator 66 is an important element for directing the operation of the rest of the circuitry depending upon the relative times of occurance of the $T_\phi$ signal from the divide-by-eight ring counter 58 and the $\overline{\text{POSITION CLOCK}}$ signal from the integrators as has just been described with reference to FIG. 5. In particular, the phase comparator 66 outputs appropriate signals to direct the operation of the current limit adjust circuitry 68, which in turn controls the current limit comparator 72. Additionally, the phase comparator 66 directs the operation of the rotation sequencer 74 by means of pulses on the SEQUENCER CLOCK line. Details of an illustrative phase comparator 66, together with the divide-by-eight ring counter 58 intimately associated therewith, will now be described with reference to FIG. 6, followed by a description of detailed circuitry implementing the current limit comparator 72 described with particular reference to FIG. 7.

Figure 6:
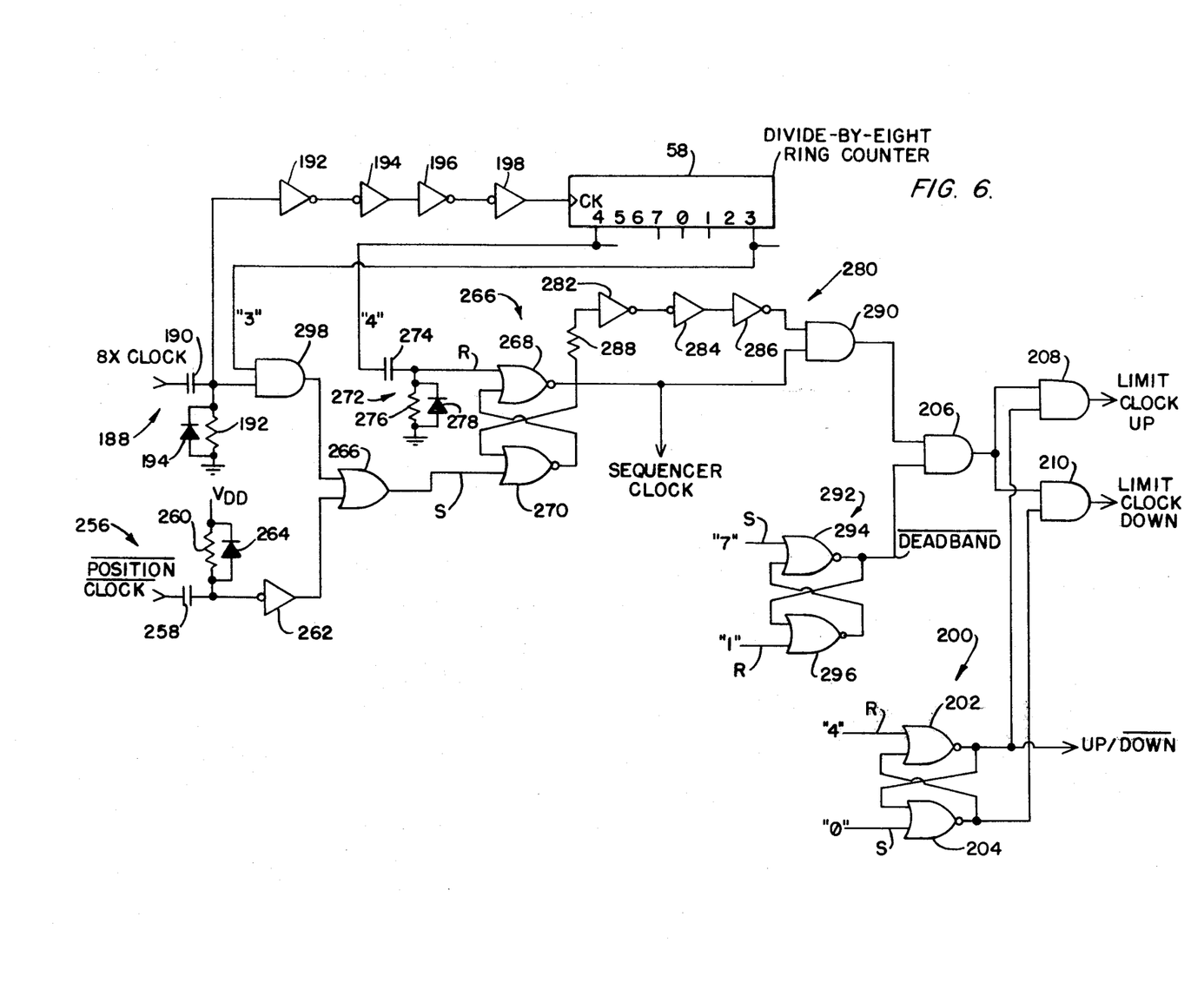
FIG. 6 is a digital logic schematic diagram of the phase comparator block of the FIG. 3 block diagram, together with its associated divide-by-eight ring counter.

In FIG. 6, the divide-by-eight ring counter 58 more particularly may be seen to comprise a monolithic integrated circuit four-stage Johnson counter having eight decoded outputs respectively labeled $\phi$, 1, 2, 3, 4, 5, 6 and 7. Only one output at a time is high and the sequence continuously repeats in ring counter fashion in response to low-to-high transitions on the clock (CK) input. An RCA type number CD4022B has been found to be suitable.

The 8X CLOCK input from the voltage controlled oscillator 54 (FIG. 3) is connected through a differentiating network 188 comprising a series capacitor 190 and through a series of four inverters connected as a delay line to the ring counter 58 clock (CK) input. A pull down resistor 192 is connected between the inverter 192 input and circuit reference, and a negative transition limiting diode 194 parallels the resistor 192.

It will be appreciated that, in operation, the divide-by-eight ring counter 58 goes through one complete cylce for every eight input pulses on the 8X CLOCK line, this complete cycle corresponding to the transition from one of the FIG. 2 commutation intervals to the next FIG. 2 commutation interval.

For convenience, the "$\phi$" output of the ring counter 58 has arbitrarily been designated as the cycle midpoint, and thus may be considered the $T_\phi$ line of FIG. 3. In accordance with this arbitrary designation, each cycle of the ring counter 58 begins with a count of "4" and continues up through "7", around through "$\phi$", and ending with a count of "3", whereupon the sequence repeats. The count of "$\phi$" being reached (leading edge of pulse) indicates a particular desired rotor position, and the time of occurrence of the $\overline{\text{POSITION CLOCK}}$ signal from the integrator, indicating actual instantaneous rotor position, is compared with the time of occurrence of the "$\phi$" ring counter 58 output.

This important comparison is actually performed in the implementation of FIG. 6 by means of a Set/Reset flip-flop 200 comprising a pair of cross coupled NOR gates 202 and 204. An input of the upper NOR gate 202 connected to the "4" output of the ring counter 58, and an input of the lower NOR gate is connected to the "$\phi$" output of the ring counter 58, which also corresponds to the $T_\phi$ line. With this particular connection, at the beginning of each ring counter 58 cycle (at the count of "4"), the flip-flop 200 is reset, such tha the output of the NOR gate 202 supplying the UP/$\overline{\text{DOWN}}$ line goes low, and the output of the NOR gate 204 goes high.

In a manner described hereinbelow, LIMIT CLOCK pulses intended for the current limit adjust circuitry 68 pass through an AND gate 206, and are directed to either a LIMIT CLOCK UP or a LIMIT CLOCK DOWN line depending on which of a pair of AND gates 208 and 210 are enabled. The respective enabling inputs of the AND gates 208 and 210 are connected to the outputs of the NOR gates 202 and 204 comprising the Set-Reset flip-flop 200.

In operation, during the first half of a ring counter 58 cycle, that is prior to the time the count "$\phi$" is reached, the output of the NOR gate 202 is low, and thus the AND gate 208 is not enabled. The output of the NOR gate 204, however, is high, and thus the AND gate 210 supplying the LIMIT CLOCK DOWN line is high. Thus, pulses supplied through the AND gates 206 during this interval are passed through the AND gate 210 to the LIMIT CLOCK DOWN line.

This corresponds to the condition when the actual rotor position is leading desired rotor position. In circuit terms, the $\overline{\text{POSITION CLOCK}}$ output from the integrator is occurring prior to the T$_\phi$ pulse. Accordingly, the dynamic current limit is to be decreased.

On the other hand, following the mid-point of the ring counter 58 cycle, that is following the leading edge of the "$\phi$" output pulse, the flip-flop 200 is set. The output of the NOR gate 202 goes high to enable the AND gate 208 which supplies the LIMIT CLOCK UP line, and the output of the NOR gate 204 goes low such that the AND gate 210 supplying the LIMIT CLOCK DOWN line is no longer enabled.

Pulses supplied to the AND gate 206 during this interval are supplied through the AND gate to the LIMIT CLOCK DOWN line. This corresponds to the condition of the rotor lagging behind the correct position. Stated in circuit terms, the $\overline{\text{POSITION CLOCK}}$ pulse occurs after the T$_\phi$ pulse.

Figure 7:
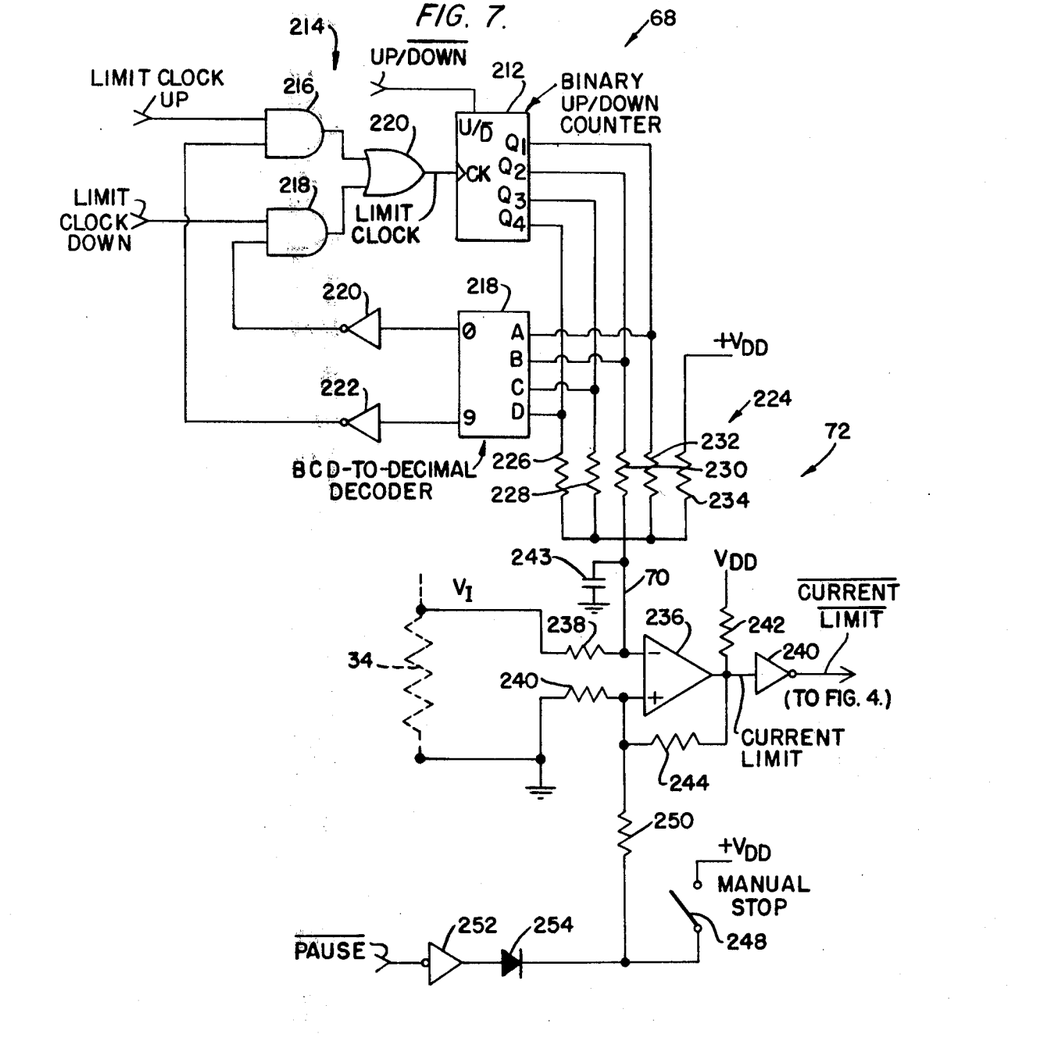
FIG. 7 is a detailed schematic diagram of the current limit adjust and current limit comparator blocks of the FIG. 3 overall control logic block diagram.

Referring temporarily to FIG. 7, the current limit adjust 68 of FIG. 3 may be more particularly seen to comprise a binary Up/Down counter 212 which may, for example, be an RCA type number CD4029B monolithic integrated circuit device. The UP/$\overline{\text{DOWN}}$ line from the NOR gate 202 of the flip-flop 200 is connected to the U/$\overline{\text{D}}$ input of the binary Up/Down counter 212 such that the counter 212 counts down when the flip-flop 200 (FIG. 6) is reset, and the counter 212 counts up when the flip-flop 200 is set.

In FIG. 7, the LIMIT CLOCK UP and LIMIT CLOCK DOWN lines from the FIG. 6 AND gates 208 and 210 are connected to the clock (CK) input of the binary Up/Down counter 212 through a logic network 214 comprising a pair of input AND gates 216 and 218 having their outputs connected to an OR gate 220, the output of which supplies a LIMIT CLOCK line connected to the counter 212 clock (CK) input.

Thus, in operation, it will be appreciated that the binary Up/Down counter continuously stores a representation of the established value of motor winding current or, expressed more precisely, the motor winding current limit above which energization of the particular energized motor winding A, B or C is momentarily interrupted by turning off the appropriate switching transistor Q$_{AT}$, Q$_{BT}$ or Q$_{CT}$ of FIG. 1. Moreover, the count in the binary Up/Down counter 212 indicating the established current limit is dynamically increased or decreased as required to maintain rotor position under the control of LIMIT CLOCK UP and LIMIT CLOCK DOWN pulses from the AND gates 208 and 210 of FIG. 6. The output of the binary Up/Down counter 212 appears on four output lines Q$_1$ through Q$_4$ in BCD format which represent decimal numbers $\phi$ through 9 in a conventional binary counting sequence. In order to ensure that the binary Up/Down counter 212 counts up or down only within limits represented by decimal numbers 0 through 9, and does not recirculate, a BCD-to-decimal decoder 218 has its inputs A, B, C and D connected to the counter 212 output lines, and the "$\phi$" and "9" outputs of the decoder 218 are connected through inverters 220 and 222 to the AND gates 218 and 216 of the logic network 214.

Thus, when the binary Up/Down counter 212 reaches its upper limit of count "9", the inverter 222 is activated, and its output goes low preventing further LIMIT CLOCK UP pulses from being passed through the AND gate. Similarly, when the lower limit of the counter 212 is reached, i.e., a count of "$\phi$", the inverter 220 is activated, removing the enabling signals from the AND gate 218.

Also depicted in FIG. 7 is the current limit comparator 72 which may be seen to comprise a programmable voltage limit comparator, programmed by means of a resistor ladder network 224 comprising resistors 226, 228, 230 and 232 connected to the outputs of the binary Up/Down counter 212, and a resistor 234 permanently tied to the +V$_{DD}$ supply.

More particularly, the comparator 72 comprises a monolithic integrated circuit comparator 236 having inputs connected through input resistors 238 and 240 to the terminals of the 0.05 ohm current sensing resistor 34 shown in the power handling circuit of FIG. 1. In operation, the voltage drop across the resistor 34 as sensed on the line V$_I$ indicates motor winding current, and this current is compared with the established current limit value by the comparator 236, the output of which controls the upper power switching transistors Q$_{AT}$, Q$_{BT}$ and Q$_{CT}$ of FIG. 1 in chopper fashion to appropriately limit motor winding current. It will be appreciated that this also has the effect of controlling applied motor voltage at a level which substantially equals motor back emf for a particular desired motor rotational velocity.

In particular, this result is accomplished by the output of the comparator 236 supplying a CURRENT LIMIT line which, in turn, supplies a $\overline{\text{CURRENT LIMIT}}$ line through an inverter 240. The $\overline{\text{CURRENT LIMIT}}$ is connected to disenable the AND gates 100, 102 and 104 of the FIG. 4 driver logic circuitry whenever the established current limit is momentarily exceeded.

The particular integrated circuit selected for the comparator 236 has an open collector output, and thus requires an output pull-up resistor 242 connected to the +V$_{DD}$ supply. A positive feedback resistor 244 provides comparator hysterisis.

To program the voltage threshold of the comparator 236, the resistor ladder network 224 is connected through the line 70 to the inverting (−) input of the comparator 236, with the line 70 having a noise reducing capacitor 243 connected to ground.

In operation, it will be appreciated that the Q$_1$ through Q$_4$ outputs of the binary Up/Down counter 212 are internally connected either to circuit reference (V$_{SS}$) or logic high (V$_{DD}$), depending upon whether the particular output is low or high in the binary counting sequence. At the lower end of the range of the counter 212, the resistors of the ladder network 224 are predominately connected to logic low, thus biasing the comparator 236 inverting (−) input such that relatively lesser current is required through the current sensing resistor 34 to cause the comparator 236 output to go high. Correspondingly, near the upper end of the counter 212 sequence, the resistors of the ladder network 224 are predominately connected to logic high, i.e., to +V$_{DD}$, biasing the comparator 236 inverting (−) input such that relatively more current is required through the current sensing resistor 34 to cause the comparator 236 output to go high.

Advantageously, the non-inverting (+) input of the comparator 236 is used for further control purposes. Specifically, a manual stop switch 248 pulls the comparator 236 non-inverting (+) input to logic high (+V$_{DD}$) through a resistor 250 whenever it is desired to stop operation of the motor 38. It will be appreciated that this biases the comparator 236 non-inverting (+) input such the comparator 236 output is high regardless of the other inputs. Similarly, the $\overline{\text{PAUSE}}$ line from the crossover detector 56 (FIG. 3) is connected through an inverter 252 and an isolation diode 254 to the resistor 250. It has been found beneficial to positively provide a momentary pause in motor winding energization at the time of each motor direction reversal.

As thus far described with reference to FIGS. 6 and 7, it will be appreciated that the phase comparator 66, the current limit adjust 68 and the current limit comparator 72 function as previously described to reduce the established current limit in the event motor rotor position is leading desired instantaneous position, and to increase the current limit in the event motor rotor actual position is lagging motor rotor desired instantaneous position.

It should also be noted that, while the straightforward demand current limiting approach described herein is presently preferred, it is contemplated that other techniques may be employed to provide effective motor winding current limiting. For example, various forms of clocked or modulated current limiting may be implemented with appropriate selection of feedback loop characteristics. Numerous approaches are known in the art, such as pulse width modulation at constant frequency; constant ON time, variable OFF time modulation; and variable ON time, constant OFF time modulation. Accordingly, the controller for limiting current may take a variety of forms.

Referring again to FIG. 6, the manner in which $\overline{\text{POSITION CLOCK}}$ pulses reach the AND gate 206, the manner in which SEQUENCER CLOCK pulses for the rotation sequencer 74 (FIGS. 3 and 4) are developed, and the manner in which a current control deadband range is introduced will now be described. Also described is the manner in which $\overline{\text{POSITION CLOCK}}$ pulses reach the AND gate 206 of FIG. 6.

In FIG. 6, the $\overline{\text{POSITION CLOCK}}$ signal line indicating that motor rotor actual position has reached a predetermined point is applied through an integrating network 256 comprising a capacitor 258 and pull-up resistor 260 to the input of an inverter 262. A positive transition limiting diode 264 parallels he pull-up resistor 260.

The pulse output of the inverter 262 is connected to one input of an OR gate 266 which, in turn, is connected to the set (S) input of a set-reset flip-flop 266 comprising a pair of cross coupled NOR gates 268 and 270. The reset (R) input of the flip-flop 266 is connected through a differentiating network 272 back to the "4" output of the ring counter 58. The differentiating network 272 may be seen to comprise a series capacitor 274 and a pull-down resistor 276, paralleled by a limiting diode 278.

In operation, it will be appreciated that at the beginning of each ring counter 58 sequence when the "4" output thereof goes high, the flip-flop 266 is reset such that the NOR gate 268 output goes low and the NOR gate 270 output goes high.

The NOR gate 268 output is connected to supply the SEQUENCER CLOCK line which clocks the rotation sequencer 74 of FIGS. 3 and 4. Additionally, the NOR gate 268 output is connected to a pulse generating network comprising three inverters 282, 284 and 286, a series resistor 288, and an AND gate 290, connected as shown.

In the operation of the pulsing network 280, it will be appreciated that when the flip-flop 266 is reset such that the NOR gate 268 is low, the upper input of the AND gate 290 is high, and the lower input is low. Upon a low to high transition of the NOR gate 268 output, the lower input of the AND gate 290 goes high, while the upper input momentarily remains high until such time as the logic level transition travels through the delay imposed by the resistor 288 and the inverters 282, 284 and 286, whereupon the upper input of the AND gate goes low.

The output of the AND gate 290 is connected to an input of the previously mentioned AND gate 206, thus supplying the AND gate 206 with SEQUENCER CLOCK pulses coinciding with the $\overline{\text{POSITION CLOCK}}$ pulses.

For some systems, depending upon particular system characteristics, it may be desirable to delay clocking of the commutation sequencer 74 until the $T_\phi$ pulse occurs, even though the motor rotor has reached a predetermined position as indicated by the output of the integrator. With such an arrangement, the commutation sequencer 74 is still advanced essentially as the rotor reaches each of a plurality of predetermined positions, but with slight delays in the event the rotor is leading desired position. During periods of motor deceleration, this commutation delay has the effect of providing dynamic braking. In the particular circuitry shown, this may be accomplished by supplying the SEQUENCER CLOCK line through an AND gate (not shown) having its inputs connected to the outputs of the NOR gates 268 and 204 of the flip-flops 266 and 200, rather than supplying the SEQUENCER CLOCK line directly from the NOR gate 268.

In order to provide a predetermined deadband or tolerance range within which no current limit adjustment action is taken in response to minor errors in rotor position, (necessary to maintain feedback loop stability in some systems), another Set-Reset flip-flop 292 comprising a pair of cross-coupled NOR gates 294 and 296 is provided, with the output of the NOR gate 294 supplying a $\overline{\text{DEADBAND}}$ line connected to disenable the AND gate 206 when the NOR gate 294 is active. For purposes of illustration, the set (S) input of the flip-flop 292 is connected to the "7" output of the ring counter 58, and the reset (R) input is connected to the "1" output of the ring counter 58. Thus, clock pulses are prevented from reaching the current limit adjust 68 if the $\overline{\text{POSITION CLOCK}}$ pulse occurs within a time interval beginning with the leading edge of the "7" ring counter 58 output pulse and ending with the leading edge of the "1" ring counter 58 output pulse.

It will be appreciated that the particular input connections to the deadband flip-flop 292 are exemplary only, and may be altered, or even dispensed with entirely, depending upon the characteristics of a particular system, as best determined experimentally.

The remaining logic circuit element of FIG. 6 is an AND gate 298 which serves to introduce an artificial position clock pulse into the remainder of the circuitry in the event an actual $\overline{\text{POSITION CLOCK}}$ pulse has not been received at the end of the ring counter 58 sequence, i.e., at count "3". To this end, the "3" output of the ring counter 58 is connected to the upper input of the AND gate 298, and the AND gate 298 output is connected to the upper input of the OR gate 266. To ensure that this artificial position clock pulse occurs at the last possible instant, the outer input of the AND gate 292 is connected to the differentiating network 188 supplied by the 8X CLOCK line, this connection functioning in cooperation with the clock delay line comprising the inverters 192, 194, 196 and 198 to accomplish the desired result. Specifically, the AND gate 298 is only activated when the 8X CLOCK pulse intended to clock the ring counter 58 to the next count (count "4") is received. During normal operation of this circuit when $\overline{\text{POSITION CLOCK}}$ pulses are regularly occurring within the ring counter 58 counting sequence, the pulses from the AND gate 298 are of no effect since the flip flop 266 has already been set via the inverter 262 and the OR gate 266, and thus the output thereof is not affected by signals applied to its set (s) input. It is not until a count of "4" at the beginning of the next ring counter 58 sequence that the flip-flop 266 is reset and made ready to receive either a $\overline{\text{POSITION CLOCK}}$ pulse or a substitute position clock pulse, as the case may be.

In order to enable those skilled in the art to practice the invention without undue experimentation, various suitable component values are identified below. It will be appreciated, however, that these are exemplary only, and in no way intended to limit the scope of the claimed invention. Similarly, the specific circuitry presented herein is illustrative only, and is not intended to limit the scope of the claimed invention.

| Resistors | |
|---|---|
| 34 | 0.05 Ohm |
| 64 | 2 K Ohm |
| 128, 132, 134, 136 | 100 K Ohm |
| 146, 162, 164, 168 | |
| 288 | |
| 130 | 5.1 K Ohm |
| 138 | 2.55 K Ohm |
| 152, 170, 192, 242, | 10 K Ohm |
| 250, 260, 276 | |
| 166 | 50 K Ohm |
| 174 | 20 K Ohm |
| 180 | 1 K Ohm |
| 182 | 510 K Ohm |
| 184 | 51 K Ohm |
| 226 | 374 K Ohm, 1% |
| 228 | 750 K Ohm, 1% |
| 230 | 1.5 Meg Ohm, 1% |
| 236 | 3.0 Meq Ohm, 1% |
| 234 | 909 K Ohm, 1% |
| 238, 240 | 10 K Ohm, 1% |
| 244 | 825 K Ohm, 1% |
| Capacitors | |
| 32 | 2-10 mfd., 200 VDC |
| 140 | 0.033 mfd |
| 142 | 0.01 mfd |
| 148 | 0.0047 mfd |
| 179 | 1 mfd |
| 186 | 130 pf |
| 190, 274 | 100 pf |
| 243 | 1000 pf |
| 258 | 470 pf |

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A speed control system for an electronically commutated motor having a rotor and a plurality of stator windings operable to produce magnetic fields in response to selective winding energization, said system comprising:
   a commutation sequencer operable to selectively energize the motor windings in a sequence appropriate for effecting motor rotor rotation, said commutation sequencer operable to advance step-by-step through the sequence as the rotor reaches each of a plurality of predetermined positions;
   a storage device for storing a changeable representation of an established limit for motor winding current;
   a controller responsive to said representation for limiting current through motor windings energized by said sequencer to the established limit;
   a sensor for determining actual rotor position;
   a source of periodic signals representative of desired rotor position and occurring at a rate proportional to desired rotational velocity, the time of occurrence of each individual one of the periodic signals representative of a particular instantaneous desired rotor position; and
   and adjustment element responsive to said sensor and to said periodic signal source, said adjustment element operable to periodically compare actual rotor position to desired rotor position and to decrease the established limit for motor winding current in the event actual rotor position leads desired rotor position by at least a predetermined amount, and to increase the established limit for motor winding current in the event actual rotor position lags desired rotor position by at least a predetermined amount.

2. A speed control system according to claim 1, wherein said source of periodic signals generates the periodic signals at a controlled variable rate such that motor rotational velocity is correspondingly varied.

3. A speed control system according to claim 1, wherein said sensor is operable to output a signal when the rotor reaches a predetermined position.

4. A speed control system according to claim 3, which further comprises a connection from said sensor effective to advance said commutation sequencer when the rotor reaches each of a plurality of predetermined positions as sensed by said sensor.

5. A speed control system according to claim 3, wherein said adjustment element comprises:
   a phase comparator connected to receive signals from said sensor and from said source of periodic signals and, when a signal has been received from each of said sensor and said source, to output a signal indicating which of said received signals occurred first in time;
   means responsive to the output of said phase comparator for decreasing or increasing the established motor winding current limit, the current limit being decreased in the event the signal from said sensor preceeds the signal from said source by at least a predetermined amount, and the current limit being increased in the event the signal from said sensor follows the signal from said source by at least a predetermined amount.

6. A speed control system according to claim 3 wherein said sensor comprises:
   an integrator operable to integrate, with respect to time from an initial state, sampled voltage induced in a motor winding not currently energized, thereby to develop a voltage integral; and
   a comparator operable to compare the voltage integral to a predetermined reference voltage level and to provide an output signal when the voltage integral exceeds the reference voltage level indicating the rotor has reached a predetermined relative angular position.

7. A speed control system according to claim 1, wherein said controller for limiting current comprises:
   means for sensing current through energized motor windings;
   a programmable threshold comparator operable to compare the sensed current to a threshold programmed in response to the established current limit;
   a controlled switching device responsive to the output of said programmable threshold comparator and connected to interrupt energization of an energized motor winding when sensed current exceeds the programmed threshold, and to restore motor winding energization when sensed current falls below the programmed threshold by at least a predetermined amount.

8. A speed control system according to claim 7, wherein said controlled switching device also serves as an element of said commutation sequencer for selecting a particular motor winding for energization.

9. A method for controlling the rotational velocity of an electronically commutated motor having a rotor and a plurality of stator windings selectively energized in a step-by-step sequence for effecting motor rotor rotation, stepping through the sequence occurring as the rotor reaches each of a plurality of predetermined angular positions, said method comprising:
   providing a series of periodic signals representative of desired rotational velocity, the periodic signals occurring at a rate proportional to desired rotational velocity with each of the periodic signals representative of a particular instantaneous desired rotor position;
   sensing rotor position;
   providing a changeable stored current limit;
   limiting current through energized motor windings to an established limit; said
   periodically comparing sensed rotor position to desired rotor position and, in the event actual rotor position leads desired rotor position by at least a predetermined amount, decreasing the established current limit, and, in the event actual rotor position lags desired rotor position by at least a predetermined amount, increasing the established current limit.

10. A method according to claim 9, which further comprises varying the occurrence rate of the series of periodic signals such that motor rotational velocity is correspondingly varied.

11. A method according to claim 9, wherein:
    the step of sensing rotor position includes providing a signal when the rotor reaches a predetermined angular position; and wherein
    the step of periodically comparing sensed rotor position to desired rotor position comprises comparing the time of occurrence of the signal indicating the rotor has reached a predetermined angular position with the time of occurrence of one of the series of periodic signals each representative of a particular instantaneous desired rotor position.

12. A method according to claim 11, wherein the step of sensing rotor position includes:
    integrating, with respect to time from a initial state, sampled voltage induced in a motor winding not currently energized, thereby to develop a voltage integral; and
    comparing the voltage integral to a predetermined reference voltage level which is indicative of a predetermined relative angular position of the motor rotor.

* * * * *

UNITED STATES PATENT AND TRADEMARK OFFICE
CERTIFICATE OF CORRECTION

PATENT NO. : 4,250,435

DATED : February 10, 1981

INVENTOR(S) : Robert P. Alley; Richard C. Weischedel

It is certified that error appears in the above-identified patent and that said Letters Patent are hereby corrected as shown below:

Column 22, line 3, delete "said" and insert -- and --.

Signed and Sealed this

Twenty-first Day of April 1981

[SEAL]

Attest:

RENE D. TEGTMEYER

Attesting Officer     Acting Commissioner of Patents and Trademarks